Figure 1:
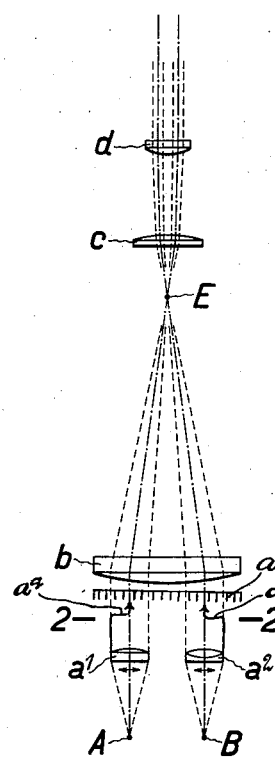

Dec. 8, 1925.

A. KÖNIG

DOUBLE IMAGE MICROSCOPE

Filed March 19, 1924    2 Sheets-Sheet 1

1,564,418

Inventor:
Albert König

Dec. 8, 1925.
A. KÖNIG
DOUBLE IMAGE MICROSCOPE
Filed March 19, 1924
1,564,418
2 Sheets-Sheet 2
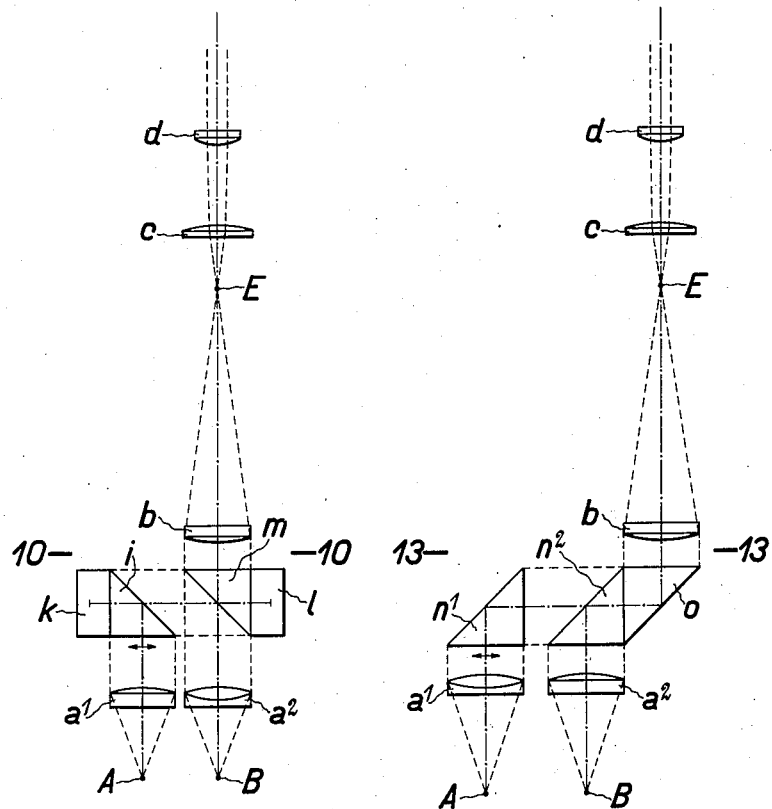
Fig. 9
Fig. 12
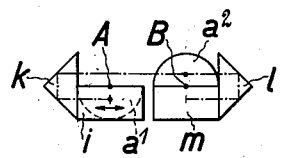
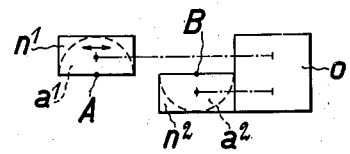
Fig. 10
Fig. 13
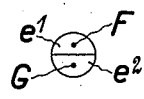
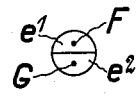
Fig. 11
Fig. 14
Inventor:
Albert König Patented Dec. 8, 1925.

1,564,418

UNITED STATES PATENT OFFICE.

ALBERT KÖNIG, OF JENA, GERMANY, ASSIGNOR TO THE FIRM CARL ZEISS, OF JENA, GERMANY.

DOUBLE-IMAGE MICROSCOPE.

Application filed March 19, 1924. Serial No. 700,373.

*To all whom it may concern:*

Be it known that I, ALBERT KÖNIG, a citizen of Germany, and residing at Jena, Germany, have invented a new and useful Double-Image Microscope (for which I have filed an application in Germany, March 31st, 1923), of which the following is a specification.

A well-known resource for the microscopic measurement of distances is the double-image microscope with which the images of the two extreme points of the distance to be measured are optically brought into coincidence and whereby the amount of the relative rotation or displacement of the optical members, which is requisite for the coincidence of the two images, furnishes the value sought for. With the usual constructional forms of such an instrument the principal rays of the imaging ray pencils, facing the object, are convergent. This, however, has the drawback that slight displacements of the microscope in its axial direction, i. e. inexact focussing of the instrument on the object, bring about an alteration of the relative position of the images of two imaged points owing to the convergence of the principal rays in the object-space, and therefore a rotation or displacement of optical members of the double-image microscope, corresponding to a wrong adjustment, may be necessary in order to bring the two images into coincidence. Accordingly the value, ascertained from the amount of rotation or displacement, of the distance of the two points, viz the distance to be measured, may show an undesirable measuring error. The object of the present invention is to eliminate this error and to provide an instrument adapted for the measurement of distances (e. g. screw-threads or graduations).

The solution of the task set is attained by making use of the well-known idea to cause the path of the principal rays of the imaging pencils to be parallel when facing the object. If, as in the present case, the measurement only refers to distances, i. e. linear magnitudes, it suffices to cause the principal rays of the pencils, facing the object and imaging the extreme points of the distance to be measured, to run in parallel in their projection upon a plane parallel to the optical axis of the microscope and determined by the distance to be measured. The principal rays of the pencils facing the image are then convergent and intersect in the same projection at one point of the image plane of the microscope, whereby the effect of inexact focussing of the microscope is dispensed with.

From the convergence of the principal rays of the pencils facing the image it follows that, although the projections of the cross sections of the pencils coincide in the image plane at one point, there is produced by each pencil an exit pupil, whose projections are the more apart, the longer is the distance to be measured. Hence, owing to the restriction of the size of his eye-pupil to a diameter of a few millimeters, the observer may in certain cases be unable to simultaneously see the coinciding images of the extreme points of the distance to be measured. Apart from this, the fact that the imaging pencils strike parts of the pupil of the eye which are comparatively far apart may lead to errors owing to the irregularities of the eye. The principal rays of the imaging pencils which, when emanating from the common image point in the image plane of the microscope, tend to the centres of gravity of the two exit pupils, diverge on their path from the image plane to the ocular. A focussing of the ocular on a plane, deviating from the image plane, or a different accommodation of the eye of the observer entails therefore a change of the apparent position of the images of the extreme points of the distance to be measured and may be the cause of an error in measuring. In order to avoid this error, it is possible to further improve the apparatus by suitably choosing and disposing the optical parts of the microscope in such a way that the principal rays of the pencils, imaging the extreme points of the distance to be measured, coincide on the image-side in the projection upon a plane, parallel to the optical axis of the microscope and determined by the distance to be measured. The projections of the exit pupils will then overlap each other in each position of the extreme points of the distance to be measured.

Figure 4:
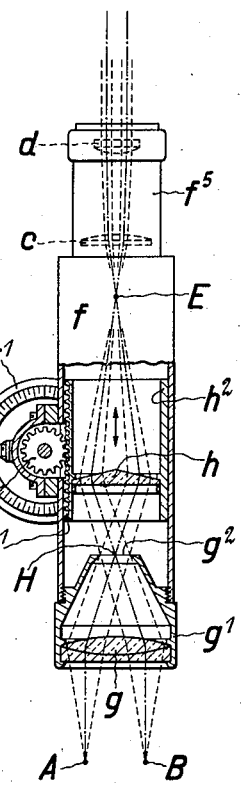
Figure 6:
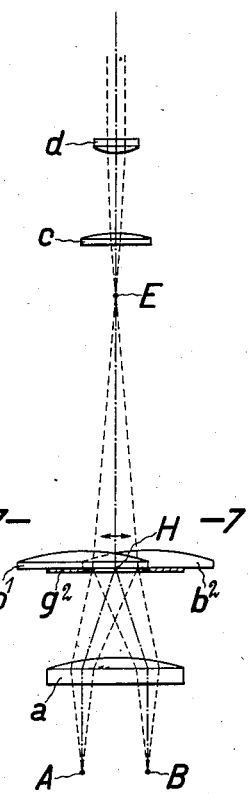
Figure 2:
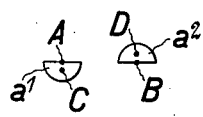
Figure 5:
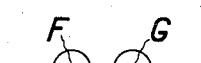
Figure 7:
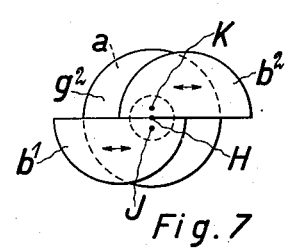
Figure 3:
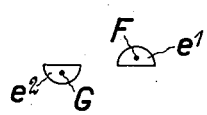
Figure 8:
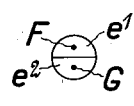

The annexed drawing shows five constructional examples of the new instrument. Figs. 1 to 3 show the first example; Fig. 1 is a longitudinal view, Fig. 2 is a cross section on the line 2—2 of Fig. 1, Fig. 3 shows in an elevation the position of the exit pupils. Figs. 4 and 5 show the second example; Fig. 4 is a longitudinal view, partly in a section, Fig. 5 shows in an elevation the position of the exit pupils. Figs. 6 to 8 illustrate the third example; Fig. 6 is a longitudinal view, Fig. 7 is a cross section on the line 7—7 of Fig. 6, Fig. 8 shows in an elevation the position of the exit pupils. Figs. 9 to 11 show the fourth example; Fig. 9 is a longitudinal view, Fig. 10 is a cross section on the line 10—10 of Fig. 9, Fig. 11 shows in an elevation the position of the exit pupils. Figs. 12 to 14 show the fifth example; Fig. 12 is a longitudinal view, Fig. 13 is a cross section on the line 13—13 of Fig. 12, Fig. 14 shows in an elevation the position of the exit pupils.

In the first example (Figs. 1 to 3) the instrument is adjusted to the extreme points A and B of a distance to be measured. The objective-system consists of two uniform front members $a^1$ and $a^2$ which are oppositely movable in the direction of the distance to be measured and the distance apart of whose centres at any one time is assumed to be read off on an indicating device consisting of a scale $a^3$ and indices $a^4$, and of a rear member $b$. The front members are constructed as semi-lenses so as to be capable of also being used for measuring very short distances. For the observation of the image produced by the objective system use is made of an ocular, consisting of a field lens $c$ and an eye-lens $d$. Owing to the shape of the semi-lenses $a^1$ and $a^2$ (see Fig. 2) the imaging ray pencils, emerging from the points A and B, have a semi-circular cross section and their principal rays traverse the semi-lenses at two points C and D which correspond to the centres of gravity of the semi-circular surfaces. As required by the invention the path of the principal rays is, when facing the object, parallel in the projection represented in Fig. 1. Between the lenses of the objective-system $a^1$ and $a^2$ respectively and $b$ the imaging pencils consist of parallel rays. Supposing the focussing is correct, the distance to be measured AB must accordingly lie in the common front focal plane of the semi-lenses $a^1$ and $a^2$ and the image plane, which is intersected by the pencils at a point E, in the rear focal plane of the back member $b$. The pencils intersect at the point E and form two semi-circular exit pupils $e^1$ and $e^2$, which are represented in Fig. 3 on an enlarged scale and whose centres of gravity F and G again form the points of intersection of the principal rays. In order to measure a distance, the microscope must be focussed in such a manner that the two extreme points A and B of the distance are sharply imaged into a plane which is perpendicular to the microscope axis at the point E and on which plane the ocular is focussed. Thereupon one displaces the images of both points by altering the distance apart of the two semi-lenses $a^1$ and $a^2$ until they coincide at one point. In that case the distance of the centres of the lenses corresponds to the length sought for of the distance to be measured.

In the second example (Figs. 4 and 5) there is screwed to the bottom of a cylindrical microscope body $f$ an objective lens $g$ with its mount $g^1$ which terminates in a diaphragm $g^2$ disposed in the rear focal plane. Inside the microscope body $f$ there is a cylinder $h^2$, provided with a rack, which forms the mount of a double wedge of glass $h$ and which can be moved in the axial direction of the microscope by means of a pinion $f^1$ and a toothed wheel $f^2$. The amount of this motion can be read off by means of an index $f^4$ on a scale $f^3$ fixed on the pinion $f^1$. At the top of the microscope body $f$ is an ocular extension $f^5$ with a field lens $c$ and an eye lens $d$. The pencils of the imaging rays of the extreme points A and B of a distance to be measured, on which the microscope is focussed, have a circular cross section owing to their being constricted by the diaphragm $g^2$. Their principal rays travel in parallel in the object-space and traverse the diaphragm $g^2$ at its centre H. The pencils are reflected towards each other by the double wedge $h$ and image the points A and B on the image plane perpendicular at a point E to the microscope axis. They produce two exit pupils $e^1$ and $e^2$ which are represented in Fig. 5 on an enlarged scale. These exit pupils have a circular cross section and are intersected by the principal rays at two points F and G which coincide with the centres of the circles. If the scale $f^3$ be so gauged that the pointer $f^4$ indicates at any one time the distance, corresponding to the position of the inner cylinder $h^2$ between the principal rays facing the object, the amount of the distance to be measured can be easily read off if the images of the extreme points A and B be brought into coincidence at the point E. Instead of the displaceable double wedge $h$ it would also be possible to use in a known way two rotatable, plane-parallel plates which may be rotated about axes perpendicular to the microscope axis through oppositely equal angles.

Although the forms illustrated by the first two examples are not sensitive to inexact focussing of the object with the objective, they are yet sensitive to inexact focussing with the ocular on the image lying in the image plane. The following three examples represent such constructions of the new instrument which do not have this drawback because in the image-space the principal rays of the two imaging pencils of the extreme points of a distance to be measured coincide at any one time in the projection upon a plane parallel to the microscope axis and determined by the distance to be measured.

In the third example (Figs. 6 to 8) the objective system of the microscope consists of a front member $a$ and two equal, semi-circular rear members $b^1$ and $b^2$ which are oppositely movable in the direction of the distance to be measured and the distance apart of whose centres at any one time is assumed to be read off on an indicating device similar to that shown in Fig. 1. These rear members are plano-convex collective lenses and lie with their plane surface in the focal plane of the front member $a$ in which there is also fixed a diaphragm $g^2$, whose centre H lies in the optical axis of the microscope. The observation is effected with the aid of an ocular $c, d$. The principal rays of the imaging pencils of the two extreme points A and B of a distance to be measured are parallel in the object-space in the projection of Fig. 6 and have a semi-circular cross section which, on the one hand, is required by the diaphragm $g^2$ and, on the other hand, by the boundary surface of the two semi-lenses $b^1$ and $b^2$. The other halves of the two pencils are deflected from the microscope axis by the semi-lenses. They are not shown in the drawing and are of no importance for the imaging. The principal rays of the imaging pencils emerging from the points A and B traverse the diaphragm $g^2$ and the semi-lenses $b^1$ and $b^2$ at two points J and K which are different from the centre of the diaphragm H and correspond to the centres of gravity of half the diaphragm surfaces, separated by the boundary surface of the semi-lenses $b^1$ and $b^2$. On their further path the pencils intersect at a point E and form two semi-circular exit pupils $e^1$ and $e^2$ which are represented in Fig. 8 on an enlarged scale and whose centres of gravity F and G again form the points of intersection of the principal rays. When measuring, the microscope is to be focussed in such a way that the two extreme points A and B are sharply imaged in a plane, which is perpendicular to the microscope axis at the point E and on which the ocular is focussed. If the indicating device be so gauged as to indicate at any one time the distance apart of the principal rays facing the object and corresponding to the distance apart of the centres of the semi-lenses $b^1$ and $b^2$, it is possible to easily read off the length of the distance to be measured if the images of the points A and B are brought into coincidence at the point E by altering the distance apart of the two semi-lenses.

The fourth and the fifth example (Figs. 9 to 11 and 12 to 14) show improvements of the first constructional example. In both of these examples between the front members $a^1$ and $a^2$ respectively and the rear member $b$, between which the imaging pencils have parallel rays, there are interposed prisms whose construction may be seen from Figs. 10 and 13. In the example according to Figs. 9 to 11 the pencil, traversing the semi-lens $a^1$, undergoes by means of four isosceles-rectangular prisms $i, k, l$ and $m$ a sixfold reflection with a deflection by 90° each, so that it enters the rear lens $b$ in parallel to itself and the pencil traversing the semi-lens $a^2$. The semi-lens $a^1$ with the prisms $i$ and $k$ is displaceable in the direction of the distance to be measured and the distance of its centre from the centre of the fixed semi-lens $a^2$ is assumed to be read off on an indicating device similar to that shown in Fig. 1. In the example according to Figs. 12 to 14 both pencils parallel to each other are reflected in parallel to themselves by means of a twofold reflection each with a deflection by 90° each in three isosceles-rectangular prisms $n^1, n^2$ and $o$, prior to their traversing the rear lens $b$. With this arrangement the semi-lens $a^1$ with the prism $n^1$ is displaceable in the direction of the distance to be measured and the distance at any one time of their centre from the centre of the fixed semi-lens $a^2$ is again assumed to be read off on an indicating device. The pa'rs of semi-circular exit pupils $e^1$ and $e^2$ resulting in either case are represented in Figs. 11 and 14 on an enlarged scale and the points of intersection of the principal rays, coinciding with the centres of gravity F and G of these surfaces, are indicated. The measuring process corresponds to the process set forth in the first constructional example.

I claim:

1. In a miscroscope for measuring distances optical means adapted to produce an image of each of the extreme points of the distance to be measured, means adapted to alter the distance apart of the two images in a direction parallel to the said distance, means adapted to separate from the rays, emerging from the said extreme points, such rays that the principal rays of the two pencils formed thereby emanate in parallel to each other from the said extreme points and perpendicular to the direction of the said distance, and an indicating device adapted to indicate the distance apart of the said two images in a direction parallel to the said distance.

2. In a microscope for measuring distances optical means adapted to produce an image of each of the extreme points of the distance to be measured, means adapted to alter the distance apart of the two images in a direction parallel to the said distance, means adapted to separate from the rays, emerging from the said extreme points, such rays that the principal rays of the two pencils formed thereby emanate in parallel to each other from the said extreme points, and an indicating device adapted to indicate the distance apart of the said two images in a direction parallel to the said distance.

3. In a microscope for measuring distances optical means adapted to produce an image of each of the extreme points of the distance to be measured, means adapted to alter the distance apart of the two images in a direction parallel to the said distance, means adapted to separate from the rays, emerging from the said extreme points, such rays that the principal rays of the two pencils formed thereby emanate in parallel to each other from the said extreme points and perpendicular to the direction of the said distance and strike the image plane of the microscope at the same point in the projection upon a plane parallel to the said distance and perpendicular to the said image plane, and an indicating device adapted to indicate the distance apart of the said two images in a direction parallel to the said distance.

4. In a microscope for measuring distances two front lenses disposed side by side and displaceable relatively to each other, a collective lens disposed behind the two front lenses and adapted to receive the rays emerging from the front lenses, an ocular disposed behind the said collective lens, and an indicating device adapted to indicate the distance apart of the axes of the said front lenses.

5. In a microscope for measuring distances two front lenses disposed side by side and displaceable relatively to each other, a reflecting system, disposed behind the two front lenses and adapted to deflect the traversing luminous rays in such a way that the principal rays of the ray pencils emerging from the front lenses are parallel to each other behind the reflecting system in the projection upon a plane, which contains the rays coinciding with the axes of the front lenses, a collective lens disposed behind the reflecting system and an indicating device adapted to indicate the distance apart of the axes of the said front lenses.

6. In a microscope for measuring distances two front lenses disposed side by side and displaceable relatively to each other, a reflecting system, disposed behind the two front lenses and adapted to deflect the traversing luminous rays in such a way that the principal rays of the ray pencils emerging from the front lenses are parallel to each other behind the reflecting system, a collective lens disposed behind the reflecting system, and an indicating device adapted to indicate the distance apart of the axes of the said front lenses.

7. In a microscope for measuring distances two front lenses disposed side by side and displaceable relatively to each other, a reflecting system, disposed behind the two front lenses and adapted to deflect the traversing luminous rays in such a way that the principal rays of the ray pencils emerging from the front lenses coincide with each other behind the reflecting system in the projection upon a plane, which contains the rays coinciding with the axes of the front lenses, a collective lens disposed behind the reflecting system, and an indicating device adapted to indicate the distance apart of the axes of the said front lenses.

8. In a microscope for measuring distances two front lenses disposed side by side and displaceable relatively to each other, a reflecting system consisting of two parts, of which one each lies behind one of the said two front lenses and is connected to it, the reflecting system being adapted to deflect the traversing luminous rays in such a way that the principal rays of the ray pencils emerging from the front lenses are parallel to each other behind the reflecting system in the projection upon a plane, which contains the rays coinciding with the axes of the front lenses, a collective lens disposed behind the reflecting system and an indicating device adapted to indicate the distance apart of the axes of the said front lenses.

9. In a microscope for measuring distances two semi-lenses disposed side by side in opposite direction and in such a way that their plane longitudinal surfaces substantially lie in a plane, the two semi-lenses being dispaceable relatively to each other, a reflecting system consisting of two parts, of which one each lies behind one of the said semi-lenses and is connected to it, the reflecting system being adapted to deflect the traversing luminous rays in such a way that the principal rays of the ray pencils emerging from the half lenses are parallel to each other behind the reflecting system in the projection upon a plane, which contains the rays coinciding with the axes of the half lenses, and the reflecting system admitting of approaching the two semi-lenses towards each other in such a manner that the relative distance of their axes is smaller than its diameter, a collective lens disposed behind the reflecting system and an indicating device adapted to indicate the distance apart of the axes of the said front lenses.

ALBERT KÖNIG.